UNITED STATES PATENT OFFICE.

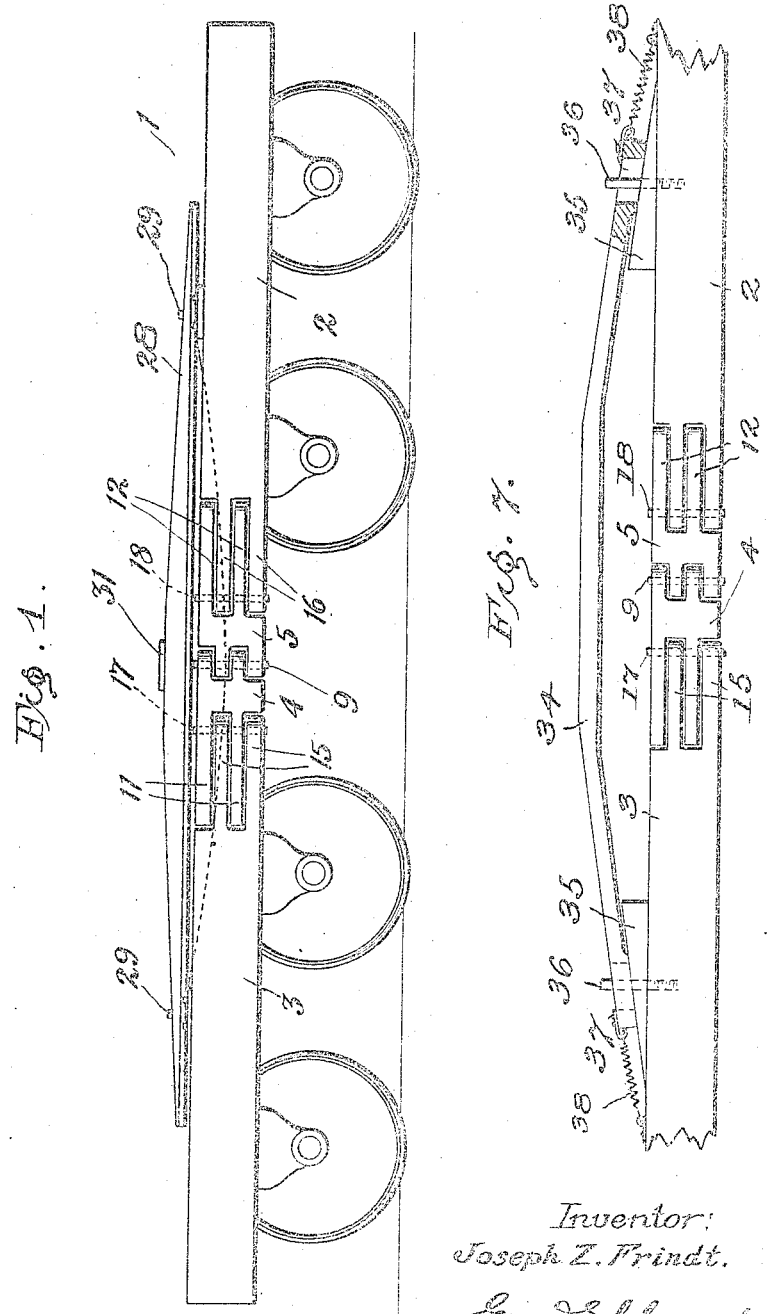

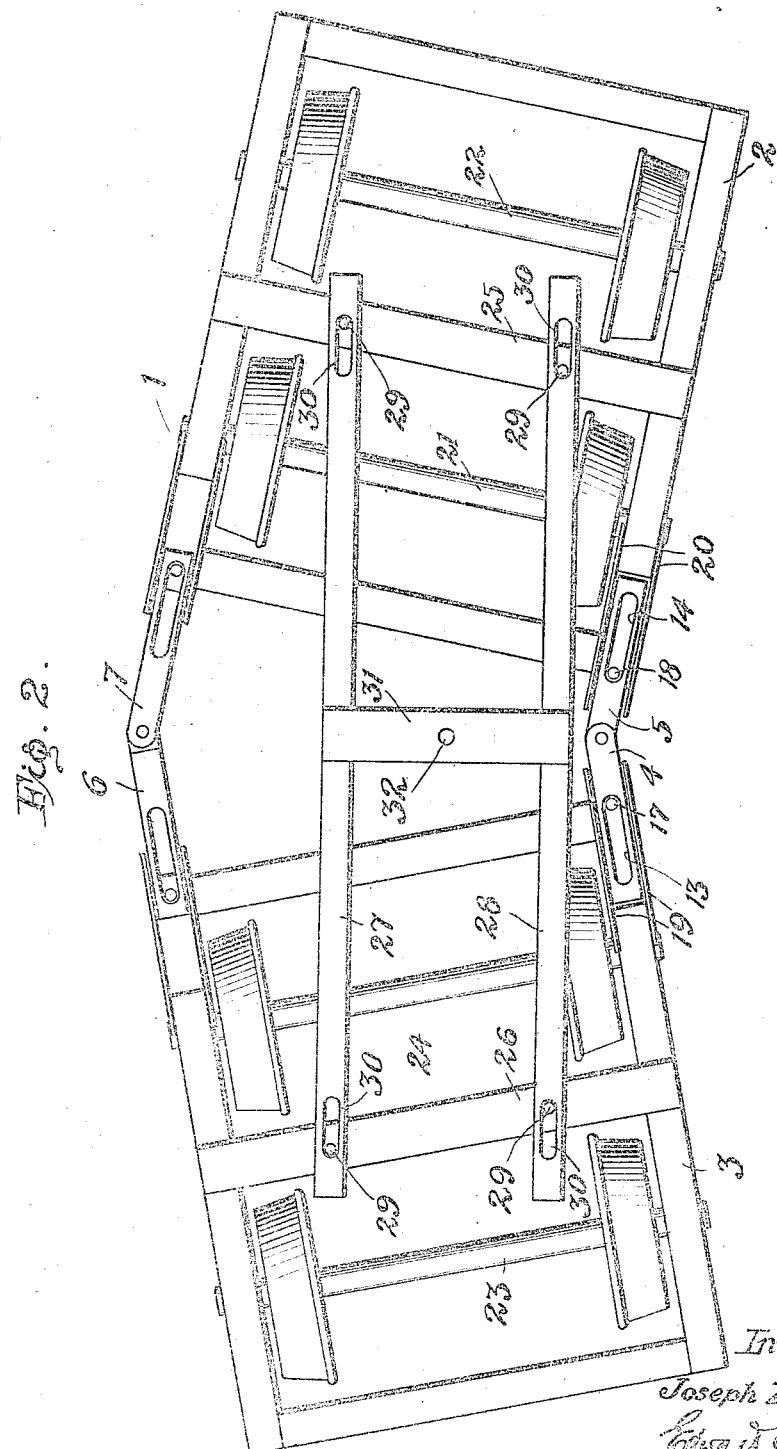

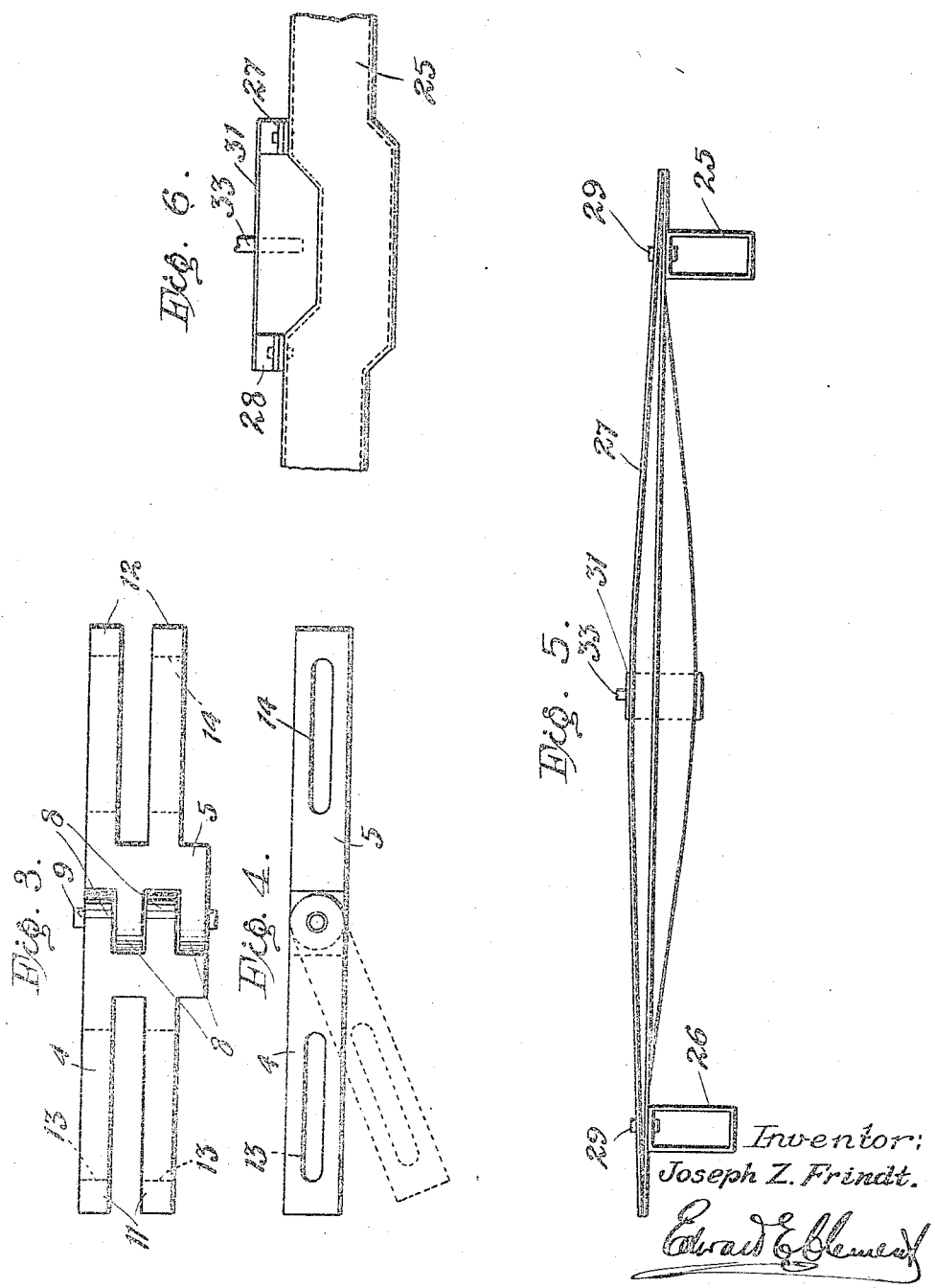

JOSEPH Z. FRINDT, OF HUTCHINSON, KANSAS, ASSIGNOR OF ONE-HALF TO CHRISTIAN GANSLE, OF HUTCHINSON, KANSAS.

RAILROAD-CAR TRUCK.

1,241,105. Specification of Letters Patent. Patented Sept. 25, 1917.

Application filed March 10, 1917. Serial No. 153,944.

*To all whom it may concern:*

Be it known that I, JOSEPH Z. FRINDT, a citizen of the United States, residing at Hutchinson, in the county of Reno and State of Kansas, have invented certain new and useful Improvements in Railroad-Car Trucks, of which the following is a specification, reference being had therein to the accompanying drawing.

My invention relates to railroad car trucks and more particularly to a truck of the curve-adjuster type.

The object of my invention is to provide a truck of the above type which will adjust itself as readily to irregular curves as to constant curves and which is particularly adapted to compensate for variations in curvature in the tracks between the front and rear wheels or wheel frames such as exist when the truck is passing from a tangent onto a curve or vice versa. A solution of this problem has been attempted through the use of cross reaches between the front and rear wheel frames, but while this is effective while the truck is on a curve of constant radius, it is a source of danger at points of transition between a straight line or large curve and a smaller curve, as the tendency of the cross reach under such conditions is to throw the rear wheels outside of the tangent or away from the center of the curve which is further aggravated by the action of centrifugal force. In the present invention this difficulty is overcome by the use of a truck frame arranged to buckle in a given plane with parallel reaches between the front and rear wheels so arranged as to shift the point of pull on the rear wheels or wheel frame away from the center toward the outside of the curve whenever the forward wheels take a course out of line with the rear wheels.

Other objects of my invention will be apparent from a perusal of the following specification and the accompanying drawings, and will be particularly pointed out in the appended claims.

In the drawings

Figure 1 is a side elevation of my improved truck with the side plates removed.

Fig. 2 is a top plan view of the same showing the side plates attached and the position of the different parts when the truck is on a curve.

Fig. 3 is a detail view on a larger scale showing the hinge joint of the truck frame in side elevation.

Fig. 4 is a top plan view of Fig. 3 with a changed position of one member shown in dotted lines.

Fig. 5 is a side elevation of one of the parallel reaches.

Fig. 6 is a fragmentary end view showing one of the supporting transoms and the arrangement of the reaches and car bolster.

Fig. 7 is a fragmentary side elevation of a modification.

Referring in detail to the drawings, 1 indicates the jointed truck frame as a whole which consists of the front and rear wheel frames 2 and 3 connected at their inner ends by the sliding hinge members 4—5 and 6—7 at opposite sides of the truck. As these pairs of hinge members are identical in structure, a description of one pair will suffice. The inner ends of the members 4 and 5 are formed with intermeshing fingers 8 perforated to receive a hinge bolt or pin 9 to form a hinge as shown in Figs. 3 and 4. The outer ends of the hinge members are formed with relatively long fingers or slides 11 and 12 with elongated eyes 13 and 14. These slides mesh with complementary slide fingers 15 and 16, in the wheel frames 3 and 2, respectively, perforated at their ends to receive the bolts 17 and 18 which pass also through the elongated eyes 13 and 14, as shown in Figs. 1 and 2, and act as retaining bolts for the sliding members.

To prevent relative lateral movement between link members such as 4 and 5 and the wheel frames 3 and 2 respectively, I provide the vertical guide plates 19 and 20 rigidly secured to the sides of the wheel frames 3 and 2, and extending along the sides of the intermeshing sliding fingers 11—15 and 12—16, respectively.

With the hinge members 4—5 and 6—7 arranged and connected in the sides of the truck frame as above described, I obtain a telescoping hinged joint operable in a horizontal plane and substantially rigid in other planes, thus permitting the front and rear sections to be turned horizontally in relation to each other and at the same time preventing rocking of the sections with its accompanying danger of derailment.

The front and rear wheel frames 2 and 3 carry pairs of axles 21—22 and 23—24, respectively, journaled therein in any suitable manner and carrying the usual flanged wheels. Supporting transoms 25 and 26 are carried by the wheel frames 2 and 3, respectively, and are connected by a pair of parallel beams or reaches 27 and 28 whose ends rest on the supporting transoms and are connected thereto through a lost-motion connection consisting of the bolts or pins 29 carried by the supporting transoms 25 and 26 and extending upwardly therefrom through the elongated eyes 30 in the ends of the reaches 27 and 28, which affords a given amount of play or lost-motion between the reaches and the supporting transoms longitudinally of the reaches and at the same time maintains the reaches substantially parallel to a line connecting the centers of the supporting transoms.

For supporting a suitable car body, not shown, I provide a bolster member 31 carried by the reaches 27—28 and arranged transversely and centrally thereof with a king pin socket 32 (Fig. 2) to receive a suitable connecting or king pin such as 33.

In operation, with the truck running on a straight track, the hinge members 4—5 and 6—7 will be straightened out in line with the sides of the truck, and partly telescoped into the front and rear wheel frames, the draft or pull between the front and rear frame sections 2 and 3 being taken up by the reaches 27 and 28. When the truck meets a curve in the track causing the forward section 2 to change its course and turn at an angle to the rear section 3, the truck is buckled as shown in Fig. 2, the hinge members near the inside of the curve bending and sliding into the sides of the front and rear wheel frames, and the hinge members toward the outside bending outwardly and sliding partly out of the wheel frames. In this position of the truck, the pins 29 toward the inside of the curve are moved toward each other taking the draft or pull off the inside reach (in this case 28) and throwing the whole draft between the front and rear wheels, on the single outer reach, both reaches 27 and 28, in practice being made sufficiently strong to take the entire load. As the pins 29 are spaced some distance from the center of their respective wheel frames, the pull on the rear frame is now off center and toward the outside of the curve which tends to turn the rear frame away from the tangent toward the inside of the curve which, as will be readily understood, is as it should be. By the term "center of wheel frame" as used in the specification and claims, I indicate a point located centrally with respect to the wheels of a given wheel frame. It will also be noticed from Fig. 2 that with the structure here shown, the point at which the car body is supported, located at the king bolt socket 32, remains mid-way in the line of the centers of the two wheel frames, thus shifting the weight of the car body toward the center of the curve to compensate for the outward tilting tendency in rounding curves.

Referring to the modified form in Fig. 7, the object of the arrangement here shown is to provide means for automatically shifting and tilting the load toward the inside of the curve, particularly in cases where the inner and outer tracks are substantially level at the curves as in street railways. This object is attained by connecting the reaches 34 with the wheel frames 3 and 2 through an inclined plane or wedge connection. This connection consists of the wedges 35 fixed to the wheel frames with their upper surfaces inclined toward the outer ends of the truck, upon which inclined surfaces the ends of the reaches 34 bear. The reaches 34 are connected with the wedge through a lost motion connection consisting of the slot or elongated eye 37 and the pin 36. This pin 36 acts also to anchor the wedge 35 to its associated wheel frame. In order to keep the reaches 34 normally centered, that is in the position indicated in Fig. 7, I provide suitable spring connections 38 between the ends of the reaches 34 and the respective wheel frames.

The operation of the modification shown in Fig. 7, as will be clearly understood from the drawing, is as follows: While the truck is running on a straight track, the draft between the front and rear wheel frames 2 and 3, respectively, will be distributed equally between the two reaches 34 so that the pins 36 will engage the outer ends of the associated slots 37 in the ends of the reaches 34. Upon rounding a curve, the truck will buckle in the same manner as that described for the preferred form, the inner sides of the wheel frames 2 and 3 approaching each other while the outer sides move away from each other. This change in the relative position of the wheel frames will of course bring the wedges 35 on the inner side of the truck closer together, while the wedges on the outer side will be pulled farther apart, the ends of the inside reach 34 sliding down the inclined plane of the wedges 35 toward the outer end thereof, and the ends of the outside reach sliding up the inclined surface of their associated wedges 35 toward the inner ends thereof. Thus the outer reach is elevated, while the inner reach is depressed, resulting in an inward tilting of the car body, the car body being also shifted toward the inside of the curve due to the fact that the reaches 34 remain straight and rigid in the same manner as the reaches 28 of Fig. 2. When used on railroad lines where the outer rail is raised at curves, the angle of the inclines may be lessened to a degree to properly coöperate with the track elevation without excessive tilting of the car.

While I have herein shown and described a specific embodiment of my invention, it is to be understood that various modifications may be made thereof within the scope of the appended claims and without departing from the spirit of the invention, and that all such modifications are contemplated by me. It should be noted that my truck is applicable to locomotives as well as cars, and the word "cars," as used in the appended claims, is to be construed broadly to include any form of body or conveyence.

Having thus described my invention what I claim and desire to secure by Letters Patent is

1. A car truck comprising a pair of wheel frames connected to each other at both sides of their adjacent ends through telescoping hinged joints, each of said joints consisting of a leaf-hinge having its leaves or hinge members formed with slide fingers meshing with complementary slide fingers in the adjacent ends of the said wheel frames and limited in their relative movement with said latter slide fingers by bolts carried by the slide fingers on the wheel frames and passing through elongated eyes in the slide fingers of said hinge members, guide plates extending along the sides of said intermeshing slide fingers to confine their relative movement to a given direction, reaches extending between said wheel frames and connected through a lost-motion connection to said wheel frames at points on each frame spaced from the center thereof, and a car support or bolster carried by said reaches.

2. A car truck comprising a pair of wheel frames juxtaposed in tandem, slide fingers carried by said wheel frames at the sides of their adjacent ends, a leaf-hinge for each side having slide fingers meshing with the slide fingers of said wheel frames on a given side, guide plates carried by said wheel frames and extending over the sides of each group of intermeshing slide fingers to confine their relative movement to a straight line, bolts carried by certain relatively fixed slide fingers and extending through elongated eyes in the slide fingers meshing therewith to limit their relative movement, and rigid connecting means extending between said wheel frames and connected through lost-motion connections with each wheel frame at points spaced from the center thereof, said lost-motion connections having play in the direction of a line passing through the centers of said wheel frames.

3. A car truck comprising a pair of wheel frames juxtaposed in tandem, slide fingers carried by said wheel frames at the sides of their adjacent ends, a leaf-hinge for each side having slide fingers meshing with the slide fingers of said wheel frames on a given side, guide plates carried by said wheel frames and extending over the sides of each group of intermeshing slide fingers to confine their relative movement to a straight line, bolts carried by certain relatively fixed slide fingers and extending through elongated eyes in the slide fingers meshing therewith to limit their relative movement, and rigid connecting means extending between said wheel frames and connected through lost-motion connections with each wheel frame at points spaced from the center thereof, said lost-motion connections having play in the direction of a line passing through the centers of said wheel frames, together with a car supporting bolster carried by said connecting means.

4. A car truck comprising a pair of wheel frames connecting in tandem to form a jointed telescoping truck adapted to buckle in a horizontal plane to adjust itself to varying curves, and rigid connecting means extending between said wheel frames arranged to take the draft between said frames through lost-motion connections between said connecting means and said frames at points on each frame spaced from the center thereof.

5. A car truck comprising a pair of wheel frames connected by hinged telescoping joints and means extending between said frames arranged to take the draft between said frames and to automatically shift the points of application of the draft toward the outside of the curve when the wheels of one of said wheel frames take a course out of line with those of the other frame.

6. A car truck comprising a frame having a joint intermediate its length permitting it to bend or buckle in a given plane only and dividing it into two relatively movable sections, wheels carried by each section, and means for taking the draft between said sections consisting of a rigid member so connected with said sections as to maintain the draft or pull between the sections symmetrical of said sections and to shift the draft to points on said sections toward the outside thereof when the truck frame is buckled or bent.

7. A car truck comprising a frame having hinged telescoping joints in the sides thereof dividing it into two sections, wheels carried by each of said sections, and means connected between said sections to take the draft off said joints and arranged to automatically shift the application of said draft to points on each section intermediate the center and the side toward the outside of the curve when the said frame is buckled.

8. A car truck comprising a pair of wheel frames connected in tandem to form a jointed telescoping truck adapted to buckle in a horizontal plane to adjust themselves to varying curves, said frames being provided with bearing surfaces inclined downwardly from the center of the truck and toward the ends thereof, and rigid connecting means extending between said wheel frames arranged to take the draft between said frames through lost motion connections between said connecting means and said inclined bearing surfaces.

9. A car truck comprising a pair of wheel frames connected in tandem to form a jointed telescoping truck adapted to buckle in a horizontal plane to adjust themselves to varying curves, said frames being provided with bearing surfaces inclined downwardly from the center of the truck and toward the ends thereof, and rigid connecting means extending between said wheel frames arranged to take the draft between said frames through lost motion connections between said connecting means and said inclined bearing surfaces at points on each frame spaced from the center thereof.

In testimony whereof I affix my signature.

JOSEPH Z. FRINDT.

Copies of this patent may be obtained for five cents each, by addressing the "Commissioner of Patents, Washington, D. C."